(12) United States Patent
Ligtenberg et al.

(10) Patent No.: US 8,023,262 B2
(45) Date of Patent: Sep. 20, 2011

(54) LID-CLOSED DETECTOR

(75) Inventors: Chris Ligtenberg, San Carlos, CA (US);
Steven P. Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 257 days.

(21) Appl. No.: 12/233,525

(22) Filed: Sep. 18, 2008

(65) Prior Publication Data

US 2009/0016003 A1 Jan. 15, 2009

Related U.S. Application Data

(63) Continuation of application No. 10/927,576, filed on Aug. 25, 2004, now Pat. No. 7,428,142.

(51) Int. Cl.
*G06F 1/16* (2006.01)

(52) U.S. Cl. .................... 361/679.55; 345/157; 455/90; 348/148

(58) Field of Classification Search .................. 345/169, 345/175, 158, 690, 619, 591, 173; 361/679.26, 361/679.01, 679.43, 679.56, 679.06, 679.27; 700/95; 348/51, 61, 148; 455/575.3, 575.9, 455/552.1; 713/300, 500
See application file for complete search history.

(56) References Cited

U.S. PATENT DOCUMENTS

| 6,509,847 | B1 | 1/2003 | Anderson | |
|---|---|---|---|---|
| 6,721,174 | B2 | 4/2004 | Bang | |
| 7,088,343 | B2 | 8/2006 | Smith et al. | |
| 7,239,302 | B2* | 7/2007 | Kim | 345/165 |
| 7,561,146 | B1* | 7/2009 | Hotelling | 345/175 |
| 7,834,855 | B2* | 11/2010 | Hotelling et al. | 345/173 |
| 2001/0035854 | A1 | 11/2001 | Rosenberg et al. | |
| 2001/0048429 | A1 | 12/2001 | Liao et al. | |
| 2002/0158838 | A1 | 10/2002 | Smith et al. | |
| 2003/0038776 | A1 | 2/2003 | Rosenberg et al. | |
| 2005/0012714 | A1 | 1/2005 | Russo et al. | |
| 2007/0182722 | A1* | 8/2007 | Hotelling et al. | 345/173 |
| 2009/0244092 | A1* | 10/2009 | Hotelling | 345/619 |

FOREIGN PATENT DOCUMENTS

JP 2001109544 A 4/2001

* cited by examiner

*Primary Examiner* — Hung Duong
(74) *Attorney, Agent, or Firm* — Blakely, Sokoloff, Taylor & Zafman LLP

(57) ABSTRACT

In one exemplary embodiment, a portable computer having a display assembly coupled to a base assembly to alternate between a closed position and an open position. An input device disposed on the base assembly senses a contact with a portion of the display assembly to detect the display assembly in the closed position.

11 Claims, 10 Drawing Sheets

LID-CLOSED DETECTOR

This application is a continuation of U.S. patent application Ser. No. 10/927,576, filed on Aug. 25, 2004 now U.S. Pat. No. 7,428,142.

TECHNICAL FIELD

The invention relates generally to portable computers, and in one embodiment, a lid-closed detector disposed on portable computers.

BACKGROUND

Advances in technology have enabled the size of personal computers to decrease. As a result, the use of portable computers, such as notebook computers, laptop computers, and notepad computers, is rapidly increasing. The portability of notebook computers and notepad computers enables a user to keep his or her computer readily accessible such that computing resources are effectively always at hand. FIG. 1 illustrates a typical notebook computer with two folding halves, with a display portion in one half and an input portion in the other half. The display portion includes a display bezel that frames a display screen. The input portion includes among other things, a keyboard for inputting data and a touchpad for navigating a cursor control.

The usability of notebook computers depends largely on the life of the power source (i.e., battery pack). When inactive for a certain period of time, or when the display portion is closed over the keyboard section, most notebook computers have a "sleep mode" feature that turns off most of the power consuming components (e.g., monitor, hard disk) while using minimal power to conserve memory in order to "wake up" the notebook computer again. Notebook computers typically have two types of sleep mode: standby and hibernation. In standby mode, the "state" of the notebook computer (programs that are running and data in memory) is copied into an area of the notebook computer's memory that stays alive while the notebook computer is standing by. The hard drive, monitor and other components are turned off, but a very small amount of power is used to keep the memory alive so that it can store the data it needs when the notebook computer wakes up. In hibernation mode, instead of writing the state of the notebook computer into memory, it copies it to the hard drive and then shuts the computer off completely.

When the display portion of a notebook computer is closed over the keyboard section, two common mechanisms detect the notebook computer in a closed configuration and actively trigger the sleep mode. As illustrated in FIG. 1, in one mechanism, a mechanical switch disposed near an edge of the input portion is depressed to activate the sleep mode. In a second mechanism, sensors are disposed on both the display and input portions that detect each other in the closed position. For example, a magnet may be disposed within the bezel of the display portion and a magnet sensor may be disposed within the body of the input portion. When in close proximity, the sensor detects the magnet disposed within the bezel, and the sleep mode is activated. The use of magnet sensors is known as Hall Effect magnet sensors.

One problem with these detecting mechanisms is that is that they contribute significantly to the manufacturing cost of notebook computers. Another problem is that sensors, magnet sensors in particular, are difficult to assemble into notebook computers because they add a level of unwanted complexity.

SUMMARY

Embodiments of a portable computer having a lid-closed detection mechanism are described. In one exemplary embodiment, a portable computer having a display assembly coupled to a base assembly alternates between a closed position and an open position. An input device disposed on the base assembly senses a contact or proximity with a portion of the display assembly to detect when the display assembly in the closed position. For example, the input device may be a touchpad sensor with a predefined region for sensing when the display assembly is closed over the base assembly.

There are numerous other embodiments which are described herein, and these embodiments generally relate to portable computers having a lid-closed detection mechanism based on expanding the functionality of existing portable computer devices.

BRIEF DESCRIPTION OF THE DRAWINGS

The present invention is illustrated by way of example, and not limitation, in the figures of the accompanying drawings in which.

DETAILED DESCRIPTION

Figure 1:
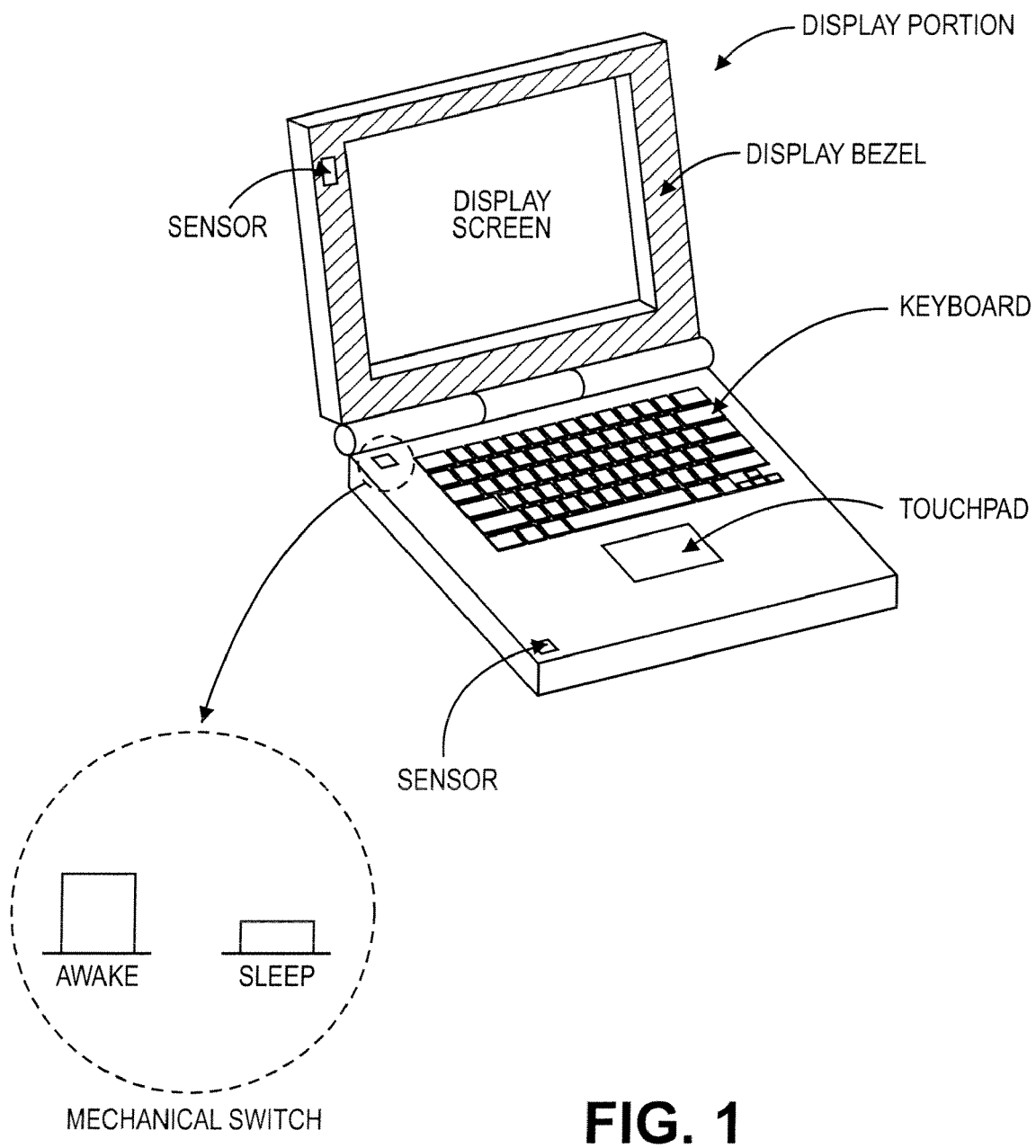
FIG. 1 illustrates a conventional portable computer.

In the following description, numerous specific details are set forth such as examples of specific, components, circuits, processes, etc. in order to provide a thorough understanding of the present invention. It will be apparent, however, to one skilled in the art that these specific details need not be employed to practice the present invention. In other instances, well known components or methods have not been described in detail in order to avoid unnecessarily obscuring the present invention.

The term "coupled" as used herein means connected directly to or indirectly connected through one or more intervening components, structures or elements. The terms "above," "below," and "between" as used herein refer to a relative position of one component or element with respect to other components or elements. As such, one component disposed above or below another component may be directly in contact with the other component or may have one or more intervening component. Moreover, one component disposed between other components may be directly in contact with the other components or may have one or more intervening components.

Various embodiments of a portable computer are described that have the ability to detect whether the display assembly is closed over the base assembly (i.e., "lid-closed"). In one embodiment of the present invention, a predetermined region of the touchpad senses, either through contact or close proximity detection, a display assembly portion and signals to the portable computer that the display assembly is closed over the base assembly. The detection of a lid-closed position may be tied to an energy conservation mechanism for the portable computer. For example, the lid-closed position may trigger a sleep mode in the portable computer in order to conserve battery consumption. The system may then be powered up again when the portable computer is no longer in lid-closed position (i.e., display assembly rotated open). Embodiments of the present invention provide advantages over prior art portable computers because the need for expensive sensor materials and complicated assembly methods are eliminated. Embodiments of a portable computer described herein extend the function of existing components (e.g., a cursor control device) to provide the lid-closed detection capability, allowing for reduction in overall system cost and size. In one embodiment, the lid-closed detection system may be suitable for use with portable computers with base and display assemblies (e.g., display frame, base assembly housing) made entirely or partially of metallic materials, in particular, display and base housings made of metals such as steel, aluminum, titanium, metallic alloys, or combinations thereof.

By way of example only, embodiments of a lid-closed detection mechanism described herein are described with respect to a portable computer. It may be appreciated, however, that embodiments of the lid-closed detection mechanism described herein are not limited for use in portable computers but may be used with other types of computing devices such as personal digital assistants (PDAs), mobile cellular telephones, portable music players such as an Moving Pictures Expert Group 1 Audio Layer 3 (MP3) player, or any type of computing device that includes a display that rotates relative to a base.

Figure 2:
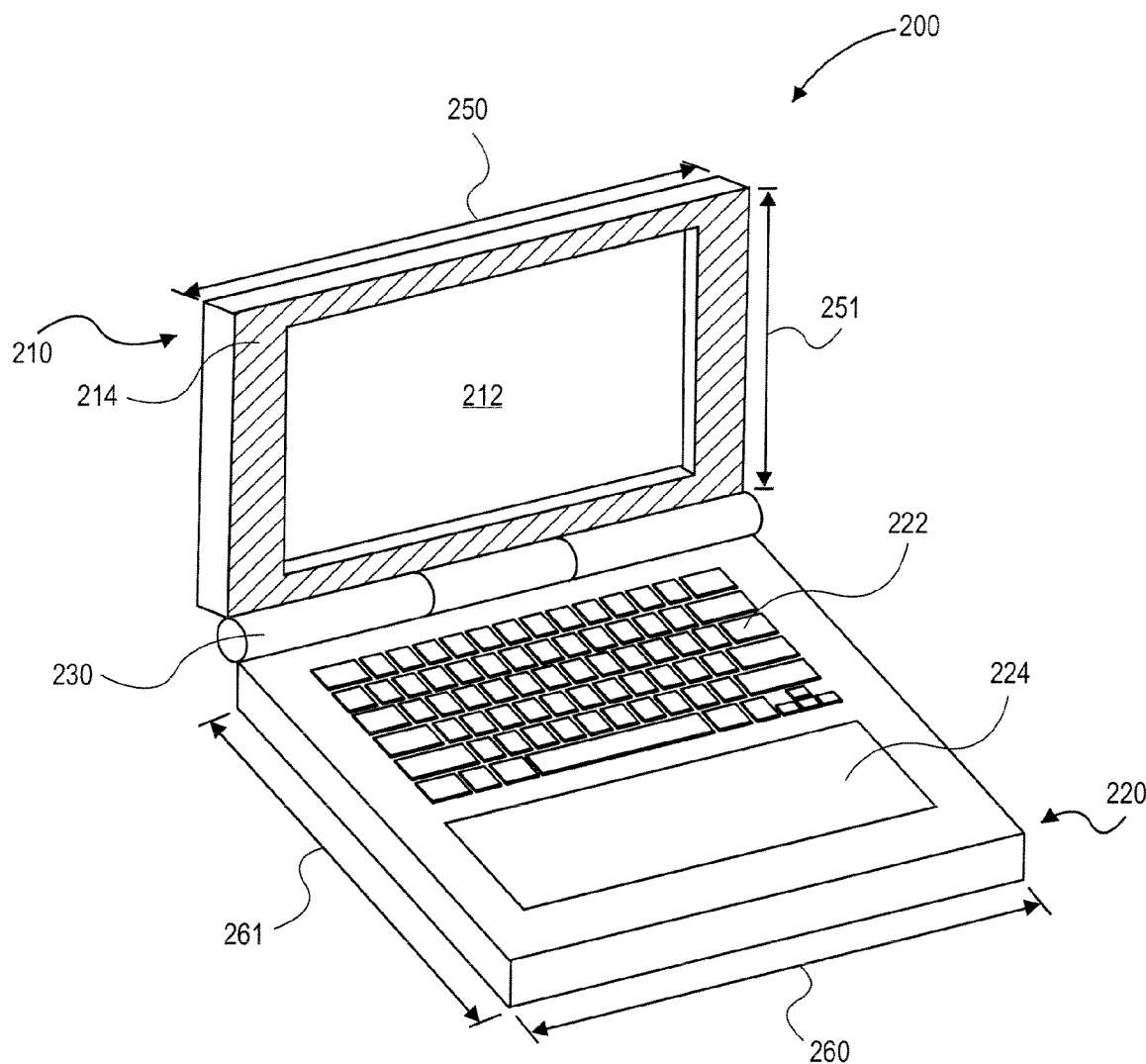
FIG. 2 illustrates one embodiment of a portable computer having a display assembly coupled to a base assembly.

FIG. 2 illustrates a perspective view of one embodiment of a portable computer 200 that includes a display assembly 210 and a base assembly 220. Display assembly 210 is coupled to base assembly 220 with a hinge assembly 230 that allows display assembly 210 to change (i.e., rotate) between an open position (as illustrated in FIG. 2) and a closed position (not shown). Display assembly includes a display screen 212 and associated video circuitry (not shown). In one embodiment, display screen 212 may be a liquid crystal display unit. In an alternative embodiment, display screen 212 may be a video monitor or any well know display device. Display screen is centered and framed on display assembly 210 by bezel 214. In the open position, display screen 212 is exposed on display assembly 210. Base assembly 220 includes one or more computer control devices or input devices, such as keyboard 222 and cursor control device 224. In the closed position, display assembly 210 covers and protects display screen 212, as well as keyboard 222 and cursor control device 224.

In one embodiment, cursor control device 224 may be a touchpad, which along with keyboard 222, allows a user to communicate with (e.g., input data into) portable computer 200. Cursor control device/touchpad 224 has the capabilities of conventional computer mouse devices, such as the ability to point, drag, tap, and double tap, as well as more general purposes such as scrolling, panning, zooming, and rotating images on display screen 212

Inside base assembly 220, there may be all the essential and well known electronic circuitry for the operation of portable computer 200, such as a central processing unit (CPU), memory, hard disk drive, floppy disk drive, flash memory drive, input/output circuitry, and power supply. Such electronic circuitry for a portable computer is well known in the art; for example, a portable computer is the Macintosh PowerBook from Apple Inc. of Cupertino, Calif.

In one embodiment, display assembly 210 has a width 250 and length 251 that is substantially similar to a width 260 and length 261 of base assembly 220 so that when display assembly 210 is closed over base assembly 220, the edges of the two parts are flush with each other. In one embodiment, cursor control device 224 (e.g., a touchpad) has an elongated width that is substantially similar to a width of keyboard 222 (e.g., the elongated width of the device 224 is about 75% to about 95% of the width 260 of the base assembly). Although no conventional palm rest areas are formed on base assembly 220, portions of cursor control device 224 may serve as palm rests when a user is typing with keyboard 222. The elongated cursor control device 224, and its interaction with display assembly 210 in order to detect whether display assembly 210 is closed over base assembly 220, is described in greater detail below with respect to FIGS. 3-6. While various embodiments described herein show a touchpad input device having an elongated width, certain embodiments of the invention may utilize a smaller touchpad or cursor control device while still providing the ability to sense the closed position of the system.

Figure 3:
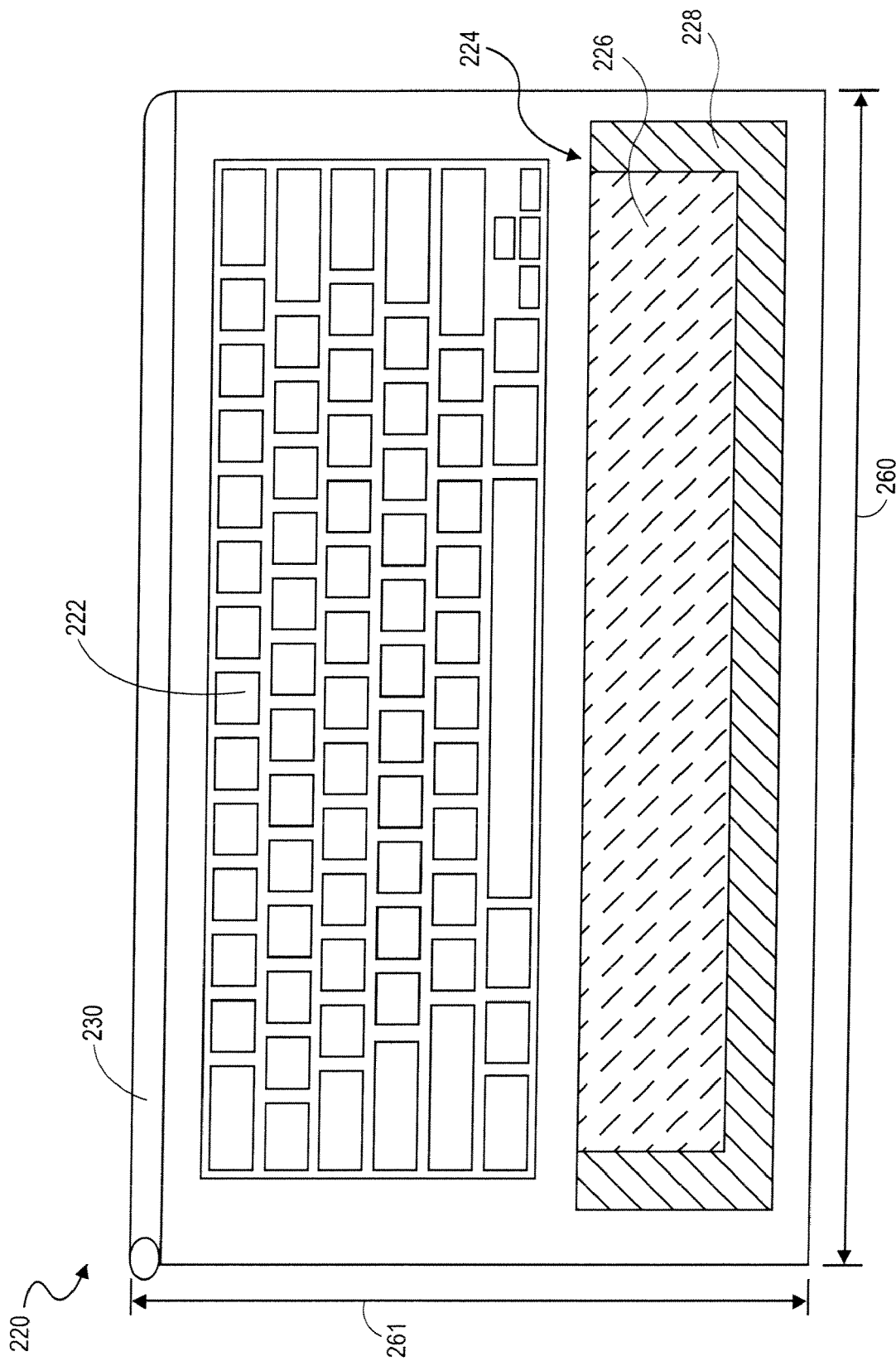
FIG. 3 illustrates an enlarged top view of the base assembly with a keyboard and cursor control device.

FIG. 3 illustrates an enlarged top view of base assembly 210 with keyboard 222 and cursor control device 224. For purposes of describing an embodiment with respect to FIG. 3, cursor control device 224 may be a touchpad-pad type of cursor control device. In one embodiment, a touchpad is defined herein as any two dimensional surface sensor that can detect one or more objects on the touchpad surface (the touchpad input), and output information regarding the location, width, presence, and number of said objects, (the touchpad outputs), in a manner that can be interpreted by the computer system to generate cursor movement. In one embodiment, cursor control device 224 may be a touchpad that utilizes capacitive sensing. The surface of the touchpad may include a grid of conductive metal wires covered by an insulator. When two electrically conductive objects come near each other without touching, their electric fields interact to form capacitance. For example, when a conductive material, such as a human finger or a metallic material, comes in contact with the touchpad surface, a capacitance forms. In alternative embodiments, other types of touchpad sensing techniques may be used, such as optical sensing and thermal sensing. Touchpads are well known in the art, and accordingly, a detailed description is not provided herein.

FIG. 3 illustrates keyboard 222 and touchpad 224 with approximate dimensions on base assembly 220. In one embodiment, base assembly 220 has an overall width 260 of up to about 400 millimeters (mm) and an overall length 261 of up to about 280 mm. In one particular embodiment, width 260 may be about 390 mm and length 261 may be about 260 mm. Keyboard 222 and touchpad 224 occupy almost all of the top surface of base assembly 220. As illustrated in FIG. 3, the overall width 260 of base assembly 220 is substantially similar to a width of keyboard 222 and touchpad 224. In an alternative embodiment, the relative sizes of keyboard 222 and touchpad 224 may be made larger or smaller (e.g., in the range of up to about 25% larger or smaller).

Touchpad 224 may incorporate a capacitive sensing mechanism to detect whether display assembly 210 is closed over base assembly 220. In one embodiment, touchpad includes a first sensor region 226 and a second sensor region 228 (as distinguished by the hash-marks in FIG. 3). Second sensor region 228 borders three sides of first sensor region 226 (i.e., does not border the side of first sensor region 226 adjacent to keyboard 222). Second sensor region 228 defines a region that, when all or a substantial portion of second sensor region 228 is being touched, indicates (e.g., a signal may be sent to the CPU) that display assembly 210 is closed over base assembly 220 (i.e., portable computer 200 is in a lid-closed position). Alternatively, when no portion or discontinuous portions of second sensor region 228 are touched (or is in close proximity with a portion of the display assembly), portable computer 200 recognizes that it is in a lid-open position.

Keyboard 222, in one embodiment, may be a full-size keyboard (i.e., a keyboard layout having dimensions similar to those of conventional desktop computer keyboards) having a conventional "QWERTY" layout, which also includes a large, elongated space bar key in the bottom row of the keyboard. The specific type of the keyboard (e.g., a "QWERTY" keyboard) that is used is not critical to the present invention.

Figure 4:
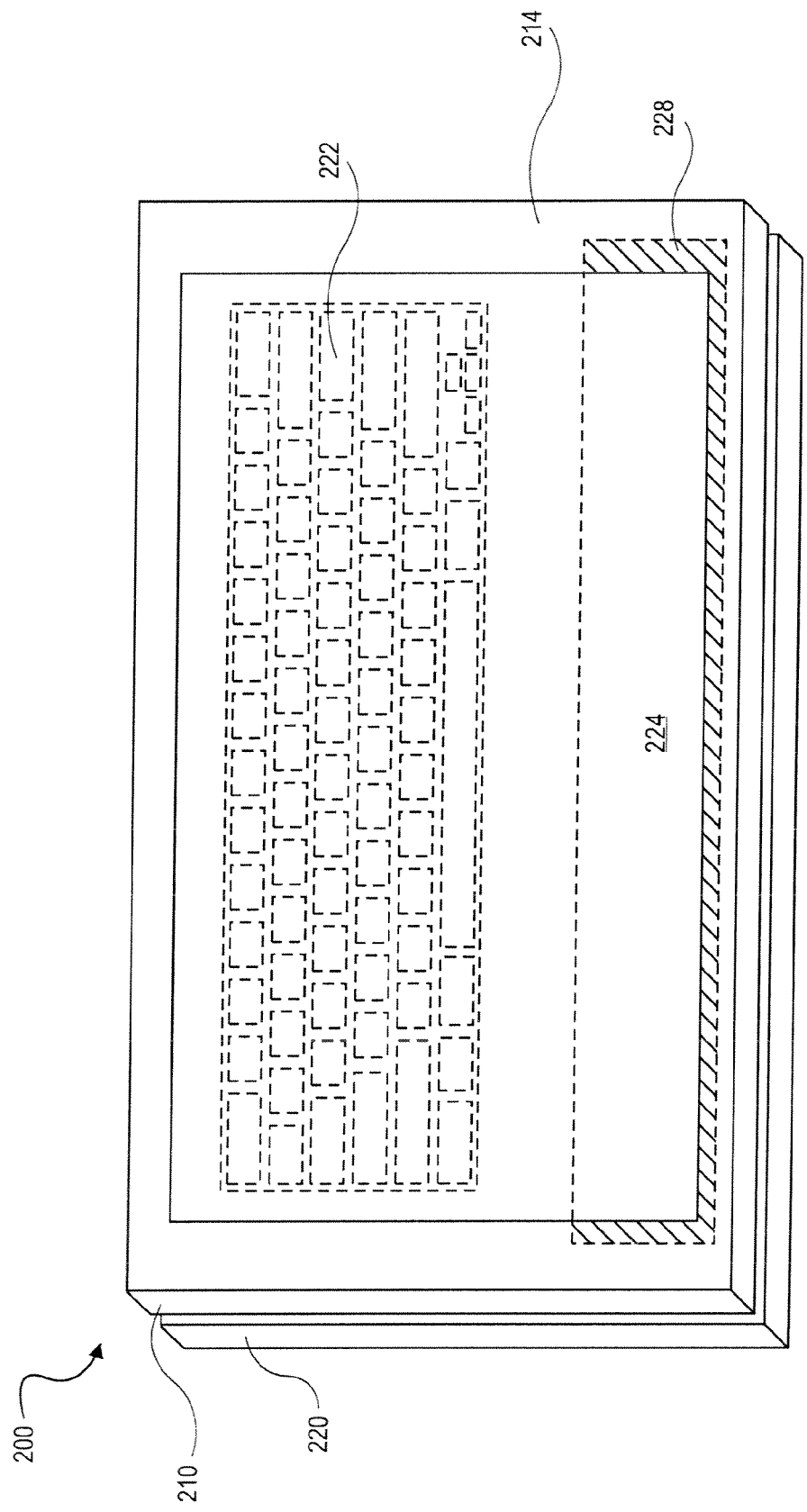
FIG. 4 illustrates a partially see-through view of the portable computer of FIG. 2.
Figure 5:
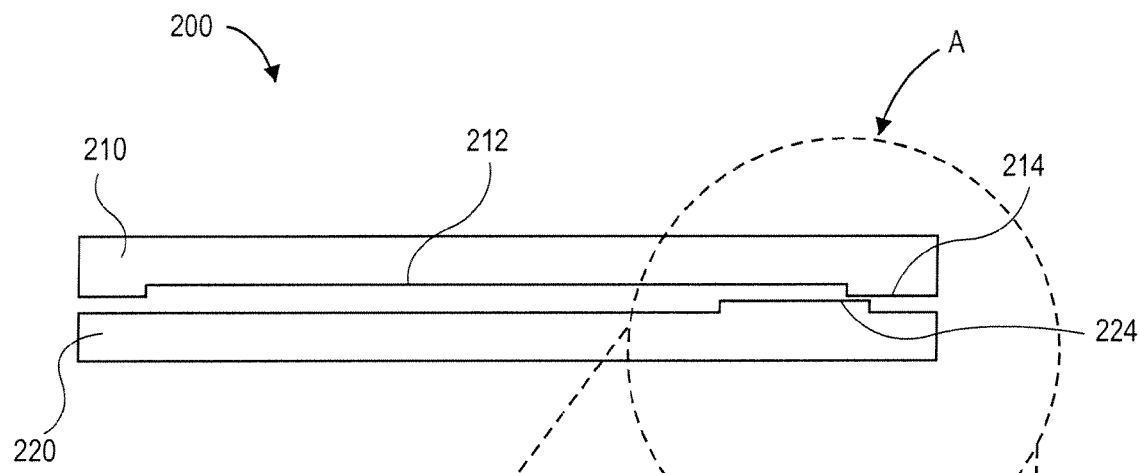
FIGS. 5 and 5A illustrate cross-sectional views of the portable computer of FIG. 2 showing the contact of a sensor region by the display assembly bezel.
Figure 5A:
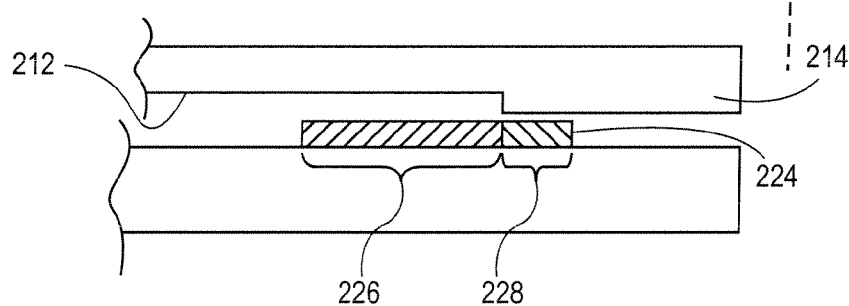

FIGS. 4, 5, and 5A further illustrate in greater detail the process by which second sensor region 228 of touchpad 224 is able to determine portable computer 200 is in a lid-closed position. As illustrated in the partially see-through view of FIG. 4, bezel 214 has a width 215 that is substantially uniform around display screen 212 (also with reference to FIG. 2). Width 215 of bezel 214 has a dimension that is wide enough to overlap, and in one embodiment, make contact with second sensor region 228. The contact of bezel 214 with all or a substantial portion of second sensor region 228 indicates to portable computer 200 that display assembly 210 is closed over base assembly 220.

FIGS. 5 and 5A illustrate cross-sectional views of portable computer 200 showing the contact of second sensor region 228 by bezel 214. As illustrated in FIG. 5, display assembly 210 is rotated over base assembly 220 in the lid-closed position. Bezel 214 frames display screen 212 and may have a thickness such that display screen 214 is recessed within bezel 214. Similarly, touchpad 224 may have a thickness such that it is raised above a top surface of base assembly 220. In an alternative embodiment, touchpad 224 may be flush with a surface of base assembly 220. FIG. 5A illustrates an enlarged view of Region A showing the contact between bezel 214 and second sensor region 228 of touchpad 224. The thicknesses of bezel 214 and touchpad 224 are exaggerated in order for clarity of explanation and in no way are the relative thicknesses meant to be indicative of actual dimensions. As discussed above, a portion bezel 214 overlaps with touchpad 224 just enough to make contact with second sensor region 228 while making no contact with first sensor region 226.

In one embodiment, touchpad 224 is a capacitive touchpad that requires actual physical contact with the bezel in order to register a "contact." For a capacitive-based touchpad, bezel 214 may be made substantially of a metallic material such as aluminum, titanium, or alloys containing metallic materials.

In alternative embodiments, touchpad 224, and in particular, second sensor region 228 may only require very close proximity to bezel 228 in order to register contact. Other types of touchpad techniques that may be used to sense bezel 214 include optical sensors and thermal sensors. The use of optical or thermal sensors would not require bezel 214, or any other part of display assembly 210 to have metallic portions. Contacting most or all of second sensor region 228 indicates that portable computer 200 is in the lid-closed position.

The detection of a lid-closed position may be tied to an energy conservation mechanism for portable computer 200. For example, the lid-closed position may trigger a sleep mode in portable computer 200 in order to conserve battery life. The system may then be powered up again when the portable computer is no longer in lid-closed position (i.e., display assembly rotated open). By incorporating a sleep-mode triggering feature in touchpad 224, there is no need to build in additional sensing mechanisms that are usually very expensive and/or that add to the complexity of the portable computer manufacturing. Touchpad 224 extends the function cursor control to provide the lid-closed detection capability, allowing for reduction in overall system cost and size.

Figure 6:
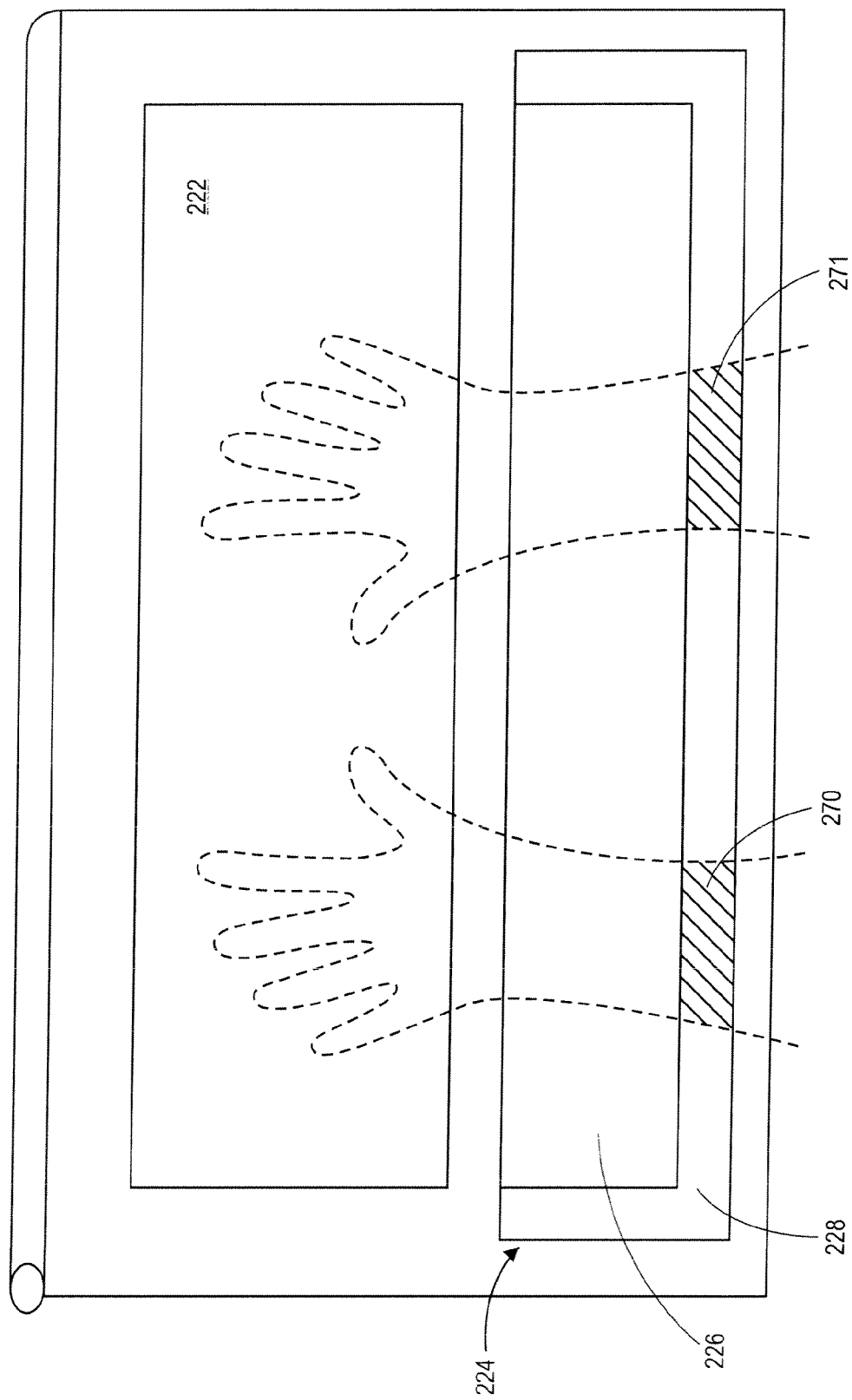
FIG. 6 illustrates one embodiment of a communication mode for the portable computer of FIG. 2.

As discussed above, a lid-closed determination is made when all of or a substantial portion of second sensor region 228 is considered touched, or in close proximity to another object (i.e., display assembly). FIG. 6 illustrates a situation where a user is in a communicating mode (i.e., interacting with data on display screen 212). In the communicating mode, portions of second sensor region 228 may be touched, as exemplified by arm/wrist portions 270 and 271, which rest on touchpad 224 during typing activity. Although FIG. 6 illustrates just one particular scenario, other communicating scenarios are possible, for example, where the user has only one hand on keyboard 222 and the other hand resting on touchpad 224 or using a finger to control a cursor on display screen 212. No matter what the communicating scenario may be, portable computer 200 is able to distinguish between a communicating mode and a lid-closed position because all of or a substantial portion of second sensor region 228 requires a touch at one time in order to trigger a sleep mode. In one embodiment, instructions may be written into portable computer 200 to require at least about 75% to about 90% coverage of second sensor region 228 for a lid-closed determination to be made.

Figure 7:
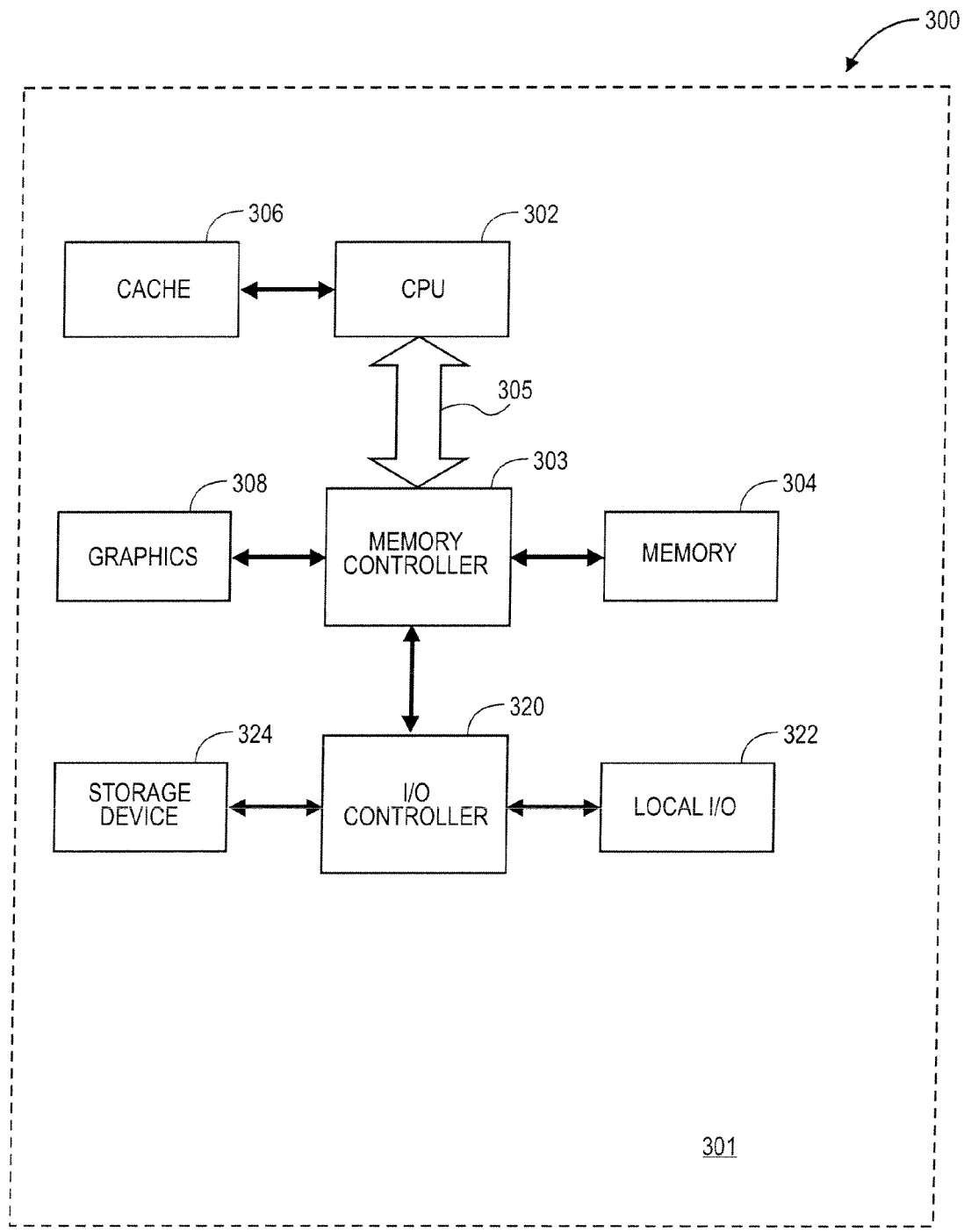
FIG. 7 illustrates a logic diagram of one embodiment of a portable computer system that supports a lid-closed detection mechanism.

FIG. 7 illustrates a logic diagram of one embodiment of a portable computer system 300 (e.g., for portable computer 200) that supports a lid-closed detection mechanism, based on a touchpad that senses the position the display assembly. Note that while FIG. 7 illustrates various components of a computer system, it is not intended to represent any particular architecture or manner of interconnecting the components as such details are not germane to the present invention. In one embodiment, the corresponding hardware components for the components described may be disposed on motherboard 301 as shown. The computer system of FIG. 7 may, for example, be an Apple Macintosh portable computer.

The portable computer system 300 includes a main logic board or motherboard 301 with at least one central processing unit (CPU) or processor 302, and one or more volatile memory units 304 such as random access memory (RAM) and read only memory (ROM), coupled to motherboard 301, as well as a graphics processor 308. More than one processor 302 may be part of system 300 (e.g., a dual processor system, or a dual core processor system). Processor 302 may be, for example, a G4 or G5 microprocessor from Motorola, Inc., or IBM, and is coupled to cache memory 306.

A memory controller 303 allows for the interface of memory unit 304 and graphics processor 308 with CPU 302. Graphics processor 308 is also coupled to a display device (e.g., display screen 212), which may be a high resolution device. Memory controller 303 also defines the speed at which data can flow between CPU 302, memory unit 304, and graphics processor 308 through bus 305. Bus 305 may also be referred to as front side bus (FSB), processor bus, memory bus or system bus. An input/out (I/O) controller 320 manages the interface of other components coupled to motherboard 301 such as storage device 324 (non-volatile) and local I/O 322. Other types of I/O devices include mice, modems, network interfaces, printers, scanners, video cameras, and other devices that are well known in the art.

In one embodiment, aspects of the recognition by portable computer 200 of a lid-closed position and/or the subsequent activation of a sleep mode, may be embodied, at least in part, in software. That is, the techniques may be carried out in a computer system or other data processing system in response to its processor, such as a microprocessor, executing sequences of instructions contained in a memory, such as memory 304 (which may include ROM, RAM, cache 306, or a remote storage device). In various embodiments, hardwired circuitry may be used in combination with software instructions to implement the present invention. Thus, the techniques are not limited to any specific combination of hardware circuitry and software or to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the CPU 302.

A machine readable medium can be used to store software and data which when executed by a data processing system causes the system to perform various methods of the present invention. This executable software and data may be stored in various places including for example memory 304, cache 306, or storage device 324, as illustrated in FIG. 7. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.), etc.

Figure 8:
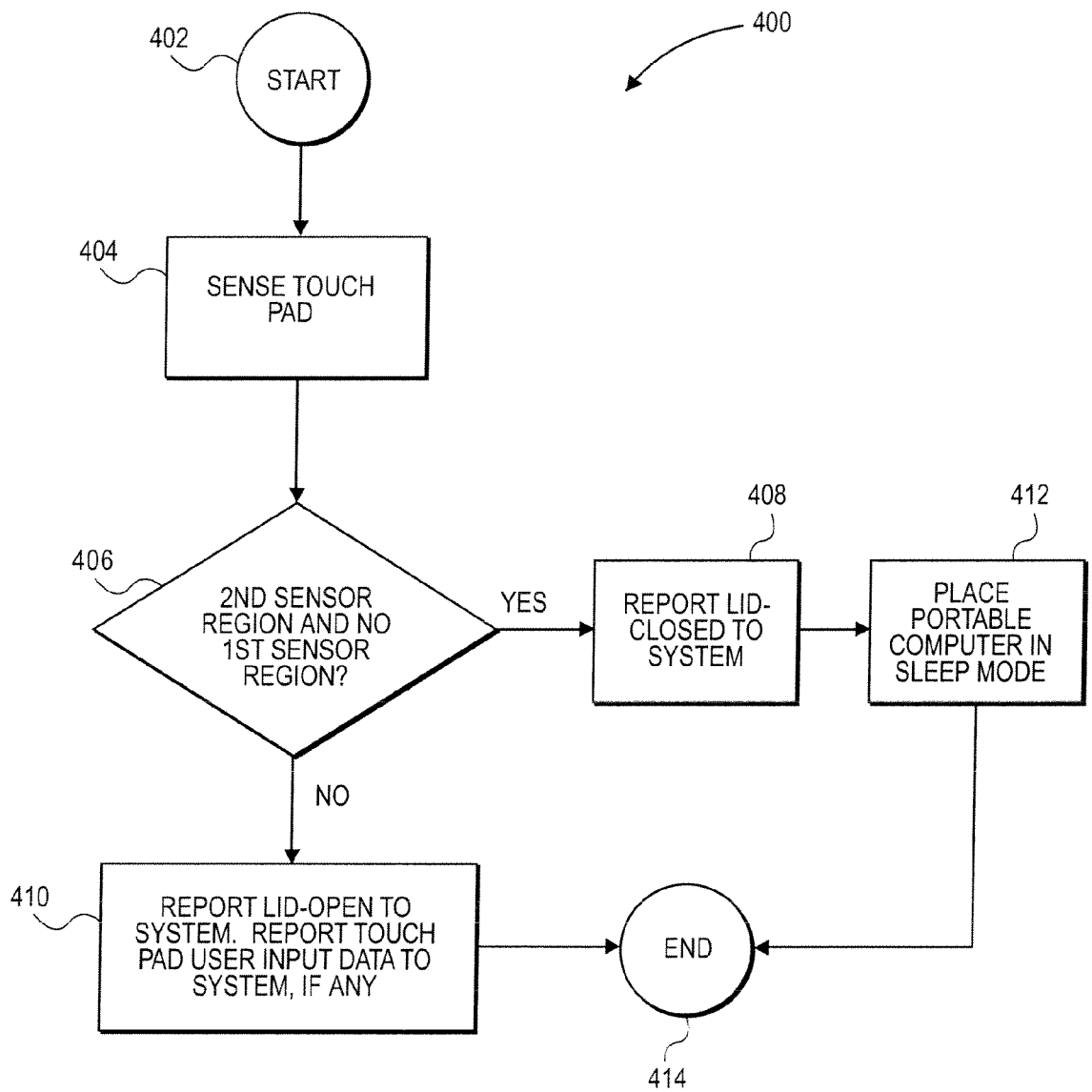
FIG. 8 illustrates a flowchart of one embodiment of an operation for detecting a portable computer in a lid-closed position.

At least one embodiment of the present invention extends the functionality of a cursor control device disposed on the base assembly of a portable computer to determine whether the display assembly is closed over the base assembly. In one embodiment, the cursor control device may be a touchpad that is able to sense the bezel of the display assembly that frames the display screen. FIG. 8 illustrates a flowchart of one embodiment of an operation 400 for detecting a portable computer in a lid-closed position (e.g., display assembly 210 closed over base assembly 220 for portable computer 200).

In one embodiment, a capacitive touchpad (e.g., touchpad 224) disposed on a top surface of the base assembly senses a contact with a portion of the display assembly. Any contact sensed by the touchpad may undergo a post processor algorithm in order interpret the contact properly. In one embodiment, the post processor is defined herein to be the software or firmware that converts the information coming from the touchpad sensor into a format that can be interpreted by the portable computer (e.g., processor 302). The post processor has as inputs, the touchpad outputs, which may include any type of physical contact made with the touchpad. The post processor then uses the "post processor algorithm" to analyze each set of inputs (location, width, number of contacts, and presence of contact) to determine whether the portable computer is in a lid-closed or a lid-open position.

The starting point 402 of operation 400 may be when the portable computer is in a power "ON" state, with the display screen visible (e.g., displaying an image or data) and the various input devices (e.g., keyboard 222, and touchpad 224) in active and responsive states. The touchpad (e.g., touchpad 224) actively senses any contact on its sensing surface while in the power "ON" state, block 404. Any contact made on the surface of the touchpad undergoes post processing to determine which region of the touchpad is being contacted. As discussed above, the touchpad may be divided into multiple sensing regions, for example, a first sensor region 226 and a second sensor region 228. Second sensor region 228 defines a region that, if all or a substantial portion is sensed, indicates that the portable computer is in a lid-closed position. As such, in one embodiment, when a contact is made on the touchpad, the post processing determines if all or most of the second sensor region is touched while no region of first sensor region is touched, decision block 406.

If it is determined that all or most of the second sensor region is touched, a signal or report is transmitted to the portable computer system that the display assembly is closed over the base assembly (i.e., lid-closed), block 408. In one particular embodiment, the reporting of a lid-closed position may trigger a sleep mode in the portable computer in order to conserve battery power and other resources, block 412. If it is determined that most or all of the second sensor region is not being touched, a signal or report is transmitted to the portable computer system that the display assembly is open relative to the base assembly, and the input devices remain active to allow communication (e.g., with display screen 212), block 410. The operation ends after the determination of lid-open or lid-closed is made, point 414. In one embodiment, operation 400 is executed repetitively, with a repetition rate depending on the state of the portable computer. In one particular embodiment, operation 400 repeats in the range of about 120 Hz to about 3 Hz. This repetition rate would allow for the system to quickly change from a sleep mode to an active mode, for example, when the display assembly is rotated open for user activity.

Figure 9:
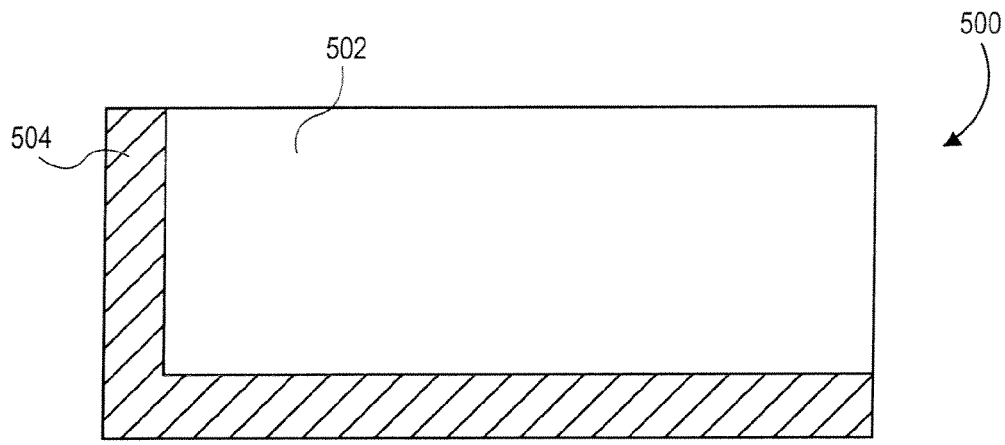
FIG. 9 illustrates a touchpad having a second sensor region defined on two sides of first sensor region.
Figure 10:
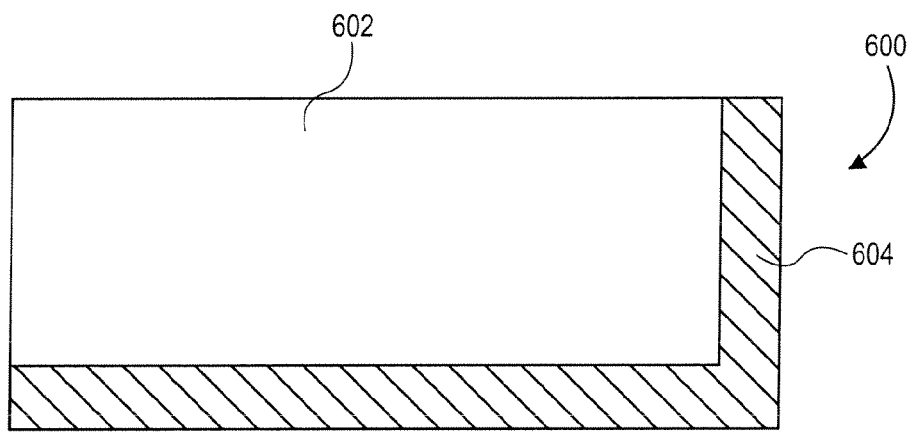
FIG. 10 illustrates another embodiment of touchpad having a second sensor region defined on two sides of first sensor region.
Figure 11:
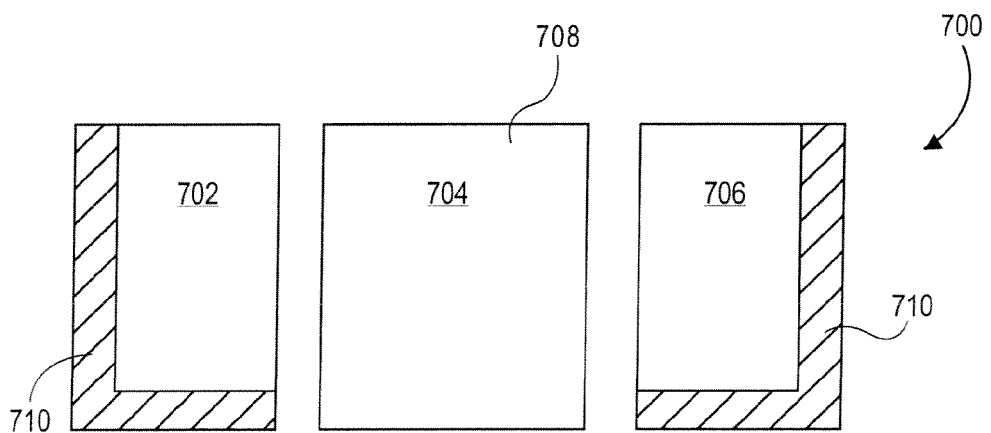
FIG. 11 illustrates one embodiment of a touchpad having three segments.

Embodiments of a lid-closed detection mechanism and method have been described above with respect to FIGS. 2-8 that employ a touchpad sensor having a two defined sensor regions. It should be noted that the touchpad may be defined with alternative sensor patterns or "signatures" to determine whether the portable computer is in a lid-closed position. FIGS. 9-11 illustrate alternative embodiments of touchpad sensor patterns that may incorporated into a portable computer for lid-closed detection. FIG. 9 illustrates a touchpad 500 having a second sensor region 504 defined on two sides of first sensor region 502. All or a substantial portion of second sensor region 504 being touched would indicate that the display assembly is closed over the base assembly of the portable computer. FIG. 10 illustrates a similar patterning for touchpad 600 in which second sensor region 604 is also defined on two sides of first sensor region 602. All or a substantial portion of second sensor region 604 being touched would indicate that the display assembly is closed over the base assembly of the portable computer.

FIG. 11 illustrates an entirely different type of sensor signature in which touchpad 700 is divided into three segments, a left segment 702, a center segment 704, and a right segment 706. Second sensor region 710 is defined only on left segment 702 and right segment 706, with first sensor region defined on all three segments. The multiple touchpad segments provide an alternative to a single touchpad area (e.g., touchpad 224) to allow for greater user operability and variety in defining touchpad areas for lid-closed detection.

Figure 12:
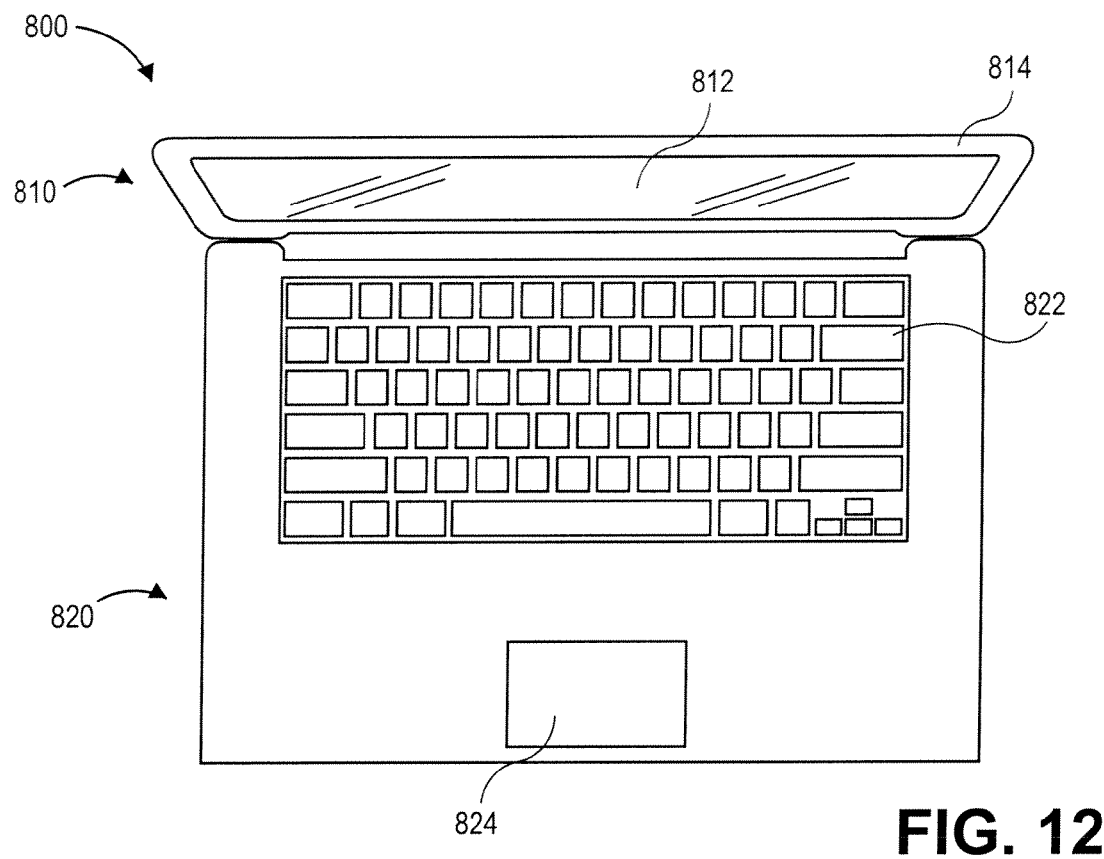
FIG. 12 illustrates a top view of one embodiment of a portable computer with a display assembly open relative to a base assembly.
Figure 13:
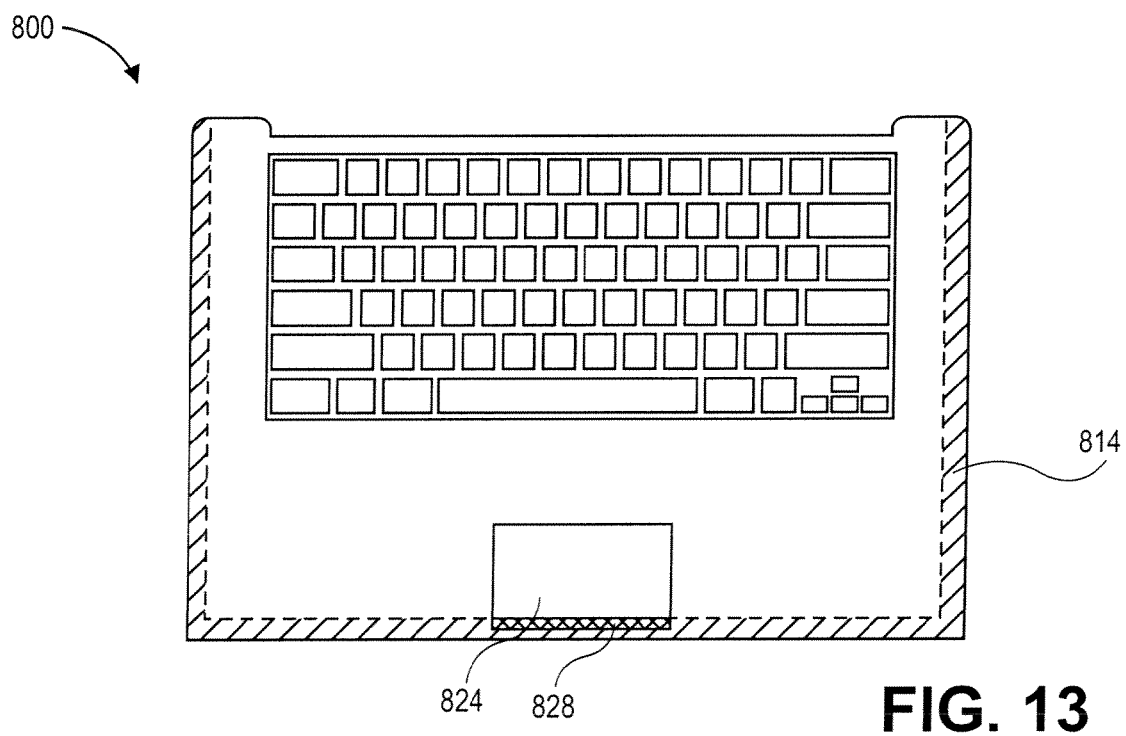
FIG. 13 illustrates a partially see-through top view of the portable computer of FIG. 12 with the display assembly closed over the base assembly.

While various embodiments described above show a touchpad having an elongated width, certain embodiments of the invention may utilize a smaller touchpad or cursor control device while still providing the ability to sense a lid-closed position for the portable computer. FIGS. 12-13 illustrate one embodiment of a portable computer 800 with a touchpad 824 that is relatively small compared to keyboard 822. In one embodiment, touchpad 824 may have an area that is about 10% to about 40% of the area of keyboard 822. In one particular embodiment, touchpad 824 may have a width between about 75 mm to about 100 mm and a length between about 40 mm to about 60 mm. As illustrated in the open position of portable computer 800 in FIG. 12, display assembly 810 includes display screen 812 framed by bezel 814. In the closed position illustrated in FIG. 13 (intended to be a see-through view of display assembly 810), a bezel 814 overlaps a portion of touch 824 (designated by cross-hash marks). In one embodiment, touchpad 824 senses a physical contact with bezel 814 to recognize a lid-closed position. In an alternative embodiment, touchpad 824 senses a close proximity of bezel 814 (or display portion 810 for that matter) to recognize a lid-closed position.

As discussed above, the detection of a lid-closed position may be linked to activating a sleep mode for the portable computer (e.g., 200, 800). However, sleep-mode activation is just one example of many advantages for lid-closed detection. In alternative embodiments, the detection of the lid-closed position may trigger other modes or features of the portable computer. In one embodiment, the portable computer may be coupled to an external display assembly (for example, an LCD or CRT monitor) when the portable computer is docked or configured to be a desktop system. In this case, the detection of the lid closed position may cause the portable computer to transmit display signals only to the external display assembly, thereby saving power that would have been used for displaying images on display assembly screen (e.g., 212, 812). In an alternative embodiment, the detection of a lid-closed position may cause the reduction in thermal output from various components disposed within the base assembly, such as the hard disk drive and microprocessors, thereby saving power consumed by these components when active.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a display assembly having a display screen framed by a bezel; and
   a base assembly hingedly coupled to said display assembly to alternate between a closed position and an open position, said base assembly having a touchpad input device comprising a sensor region responsive to the bezel while in close proximity, wherein in said closed position, a portion of said bezel is in close proximity to said sensor region to indicate that said display assembly is in said closed position.

2. The apparatus of claim 1, wherein said bezel comprises a substantially metallic material.

3. The apparatus of claim 2, wherein said bezel is made of an aluminum alloy.

4. The apparatus of claim 1, wherein said touchpad comprises a capacitive touch-sensor pad.

5. The apparatus of claim 1, wherein said touchpad comprises an optical sensor pad.

6. The apparatus of claim 1, wherein said touchpad comprises a thermal sensor pad.

7. An apparatus, comprising:
   a display assembly having a display screen framed by a bezel; and
   a base assembly hingedly coupled to said display assembly to alternate between a closed position and an open position, said base assembly having a touchpad input device, the touch pad input device having a portion overlapping a portion of the bezel in said close position, wherein in said closed position, the portion of said bezel is in close proximity to said touchpad to indicate that said display assembly is in said closed position.

8. The apparatus of claim 7, wherein said bezel comprises a substantially metallic material.

9. The apparatus of claim 7, wherein said touchpad comprises a capacitive touch-sensor pad.

10. The apparatus of claim 7, wherein said touchpad comprises an optical sensor pad.

11. The apparatus of claim 7, wherein said touchpad comprises a thermal sensor pad.

* * * * *